(12) United States Patent
Curello et al.

(10) Patent No.: US 7,698,936 B2
(45) Date of Patent: Apr. 20, 2010

(54) FUEL GAUGE FOR FUEL CARTRIDGES

(75) Inventors: Andrew J. Curello, Hamden, CT (US); Floyd Fairbanks, Naugatuck, CT (US)

(73) Assignee: Societe BIC (FR)

( * ) Notice: Subject to any disclaimer, the term of this patent is extended or adjusted under 35 U.S.C. 154(b) by 167 days.

(21) Appl. No.: 11/425,166

(22) Filed: Jun. 20, 2006

(65) Prior Publication Data

US 2006/0243045 A1 Nov. 2, 2006

Related U.S. Application Data

(62) Division of application No. 10/725,236, filed on Dec. 1, 2003, now Pat. No. 7,117,732.

(51) Int. Cl.
*G01F 23/26* (2006.01)
*G01F 23/28* (2006.01)
*H01M 8/00* (2006.01)

(52) U.S. Cl. .............. 73/149; 73/232; 73/262; 73/861.08; 73/861.47; 73/861.49

(58) Field of Classification Search .......... 73/30.01, 73/30.02, 30.03, 30.04, 149, 232, 262, 861.08, 73/861.47, 861.49
See application file for complete search history.

(56) References Cited

U.S. PATENT DOCUMENTS

| | | | | |
|---|---|---|---|---|
| 2,304,211 A | * | 12/1942 | Sparrow | 122/451.1 |
| 3,328,677 A | * | 6/1967 | Naegele | 323/294 |
| 3,461,446 A | * | 8/1969 | Sergeant | 340/516 |
| 3,555,904 A | * | 1/1971 | Lenker | 73/313 |
| 3,688,187 A | * | 8/1972 | Loos | 324/224 |
| 3,863,210 A | * | 1/1975 | Roland et al. | 340/450 |
| 4,165,641 A | * | 8/1979 | Pomerantz et al. | 73/290 R |
| 4,418,571 A | * | 12/1983 | Asmundsson et al. | 73/304 C |
| 4,447,743 A | * | 5/1984 | Bean et al. | 307/118 |
| 4,593,292 A | * | 6/1986 | Lewis | 347/88 |
| 4,630,753 A | * | 12/1986 | Anscherlik | 222/17 |
| 4,782,708 A | * | 11/1988 | Harrington et al. | 73/861.05 |
| 4,805,454 A | * | 2/1989 | LeVert | 73/295 |

(Continued)

FOREIGN PATENT DOCUMENTS

EP 541274 A1 * 5/1993

(Continued)

OTHER PUBLICATIONS

"Toshiba Announces World's First Small Form Factor Direct Methanol Fuel Cell for Portable PCs", Toshiba Press Release, Mar. 5, 2003.*

(Continued)

*Primary Examiner*—David A. Rogers
(74) *Attorney, Agent, or Firm*—The H.T. Than Law Group

(57) ABSTRACT

Fuel gauges for fuel supplies for fuel cells are disclosed. Each fuel gauge has a property that is readable by an electrical circuit. These properties are related to the remaining fuel in the fuel supplies. These properties include, but are not limited to, electrical capacitance, magnetic, semi-conducting resistance, bi-metal resistance, and oscillating magnetic field. These fuel gauges are functional at any fuel supply orientation.

21 Claims, 4 Drawing Sheets

U.S. PATENT DOCUMENTS

| | | | | |
|---|---|---|---|---|
| 4,973,993 | A * | 11/1990 | Allen | 347/7 |
| 5,005,407 | A * | 4/1991 | Koon | 73/290 R |
| 5,615,573 | A * | 4/1997 | Lee | 73/295 |
| 5,859,365 | A * | 1/1999 | Kataoka et al. | 73/149 |
| 5,909,004 | A * | 6/1999 | Hedengren et al. | 136/201 |
| 5,910,189 | A * | 6/1999 | Suzuki et al. | 73/295 |
| 6,072,165 | A * | 6/2000 | Feldman | 219/543 |
| 6,098,457 | A * | 8/2000 | Poole | 73/295 |
| 6,502,461 | B2 * | 1/2003 | Keller | 73/305 |
| 6,584,825 | B2 * | 7/2003 | Pratt et al. | 73/23.2 |
| 6,588,458 | B2 * | 7/2003 | Rodgers | 141/9 |
| 6,610,433 | B1 * | 8/2003 | Herdeg et al. | 429/17 |
| 6,641,240 | B2 * | 11/2003 | Hsu et al. | 347/7 |
| 6,808,833 | B2 * | 10/2004 | Johnson | 429/19 |
| 6,830,322 | B2 * | 12/2004 | Shihoh et al. | 347/86 |
| 2002/0101327 | A1 * | 8/2002 | Lavenuta | 338/22 R |
| 2002/0197522 | A1 * | 12/2002 | Lawrence et al. | 429/34 |
| 2003/0128098 | A1 * | 7/2003 | Lavenuta | 338/22 SD |
| 2005/0016576 | A1 * | 1/2005 | Jiang et al. | 136/224 |
| 2005/0257822 | A1 * | 11/2005 | Smith et al. | 136/205 |

FOREIGN PATENT DOCUMENTS

| | | | | |
|---|---|---|---|---|
| EP | 829705 | A1 * | 3/1998 | |
| EP | 1045132 | B1 | 10/2000 | |
| JP | 02147823 | A * | 6/1990 | |
| JP | 05248920 | A * | 9/1993 | |
| JP | 06167374 | A * | 6/1994 | |
| JP | 11241941 | A * | 9/1999 | |

OTHER PUBLICATIONS

English translation of the search report for Chinese Application No. 200480035615.2, which is related to above-referenced application.

* cited by examiner

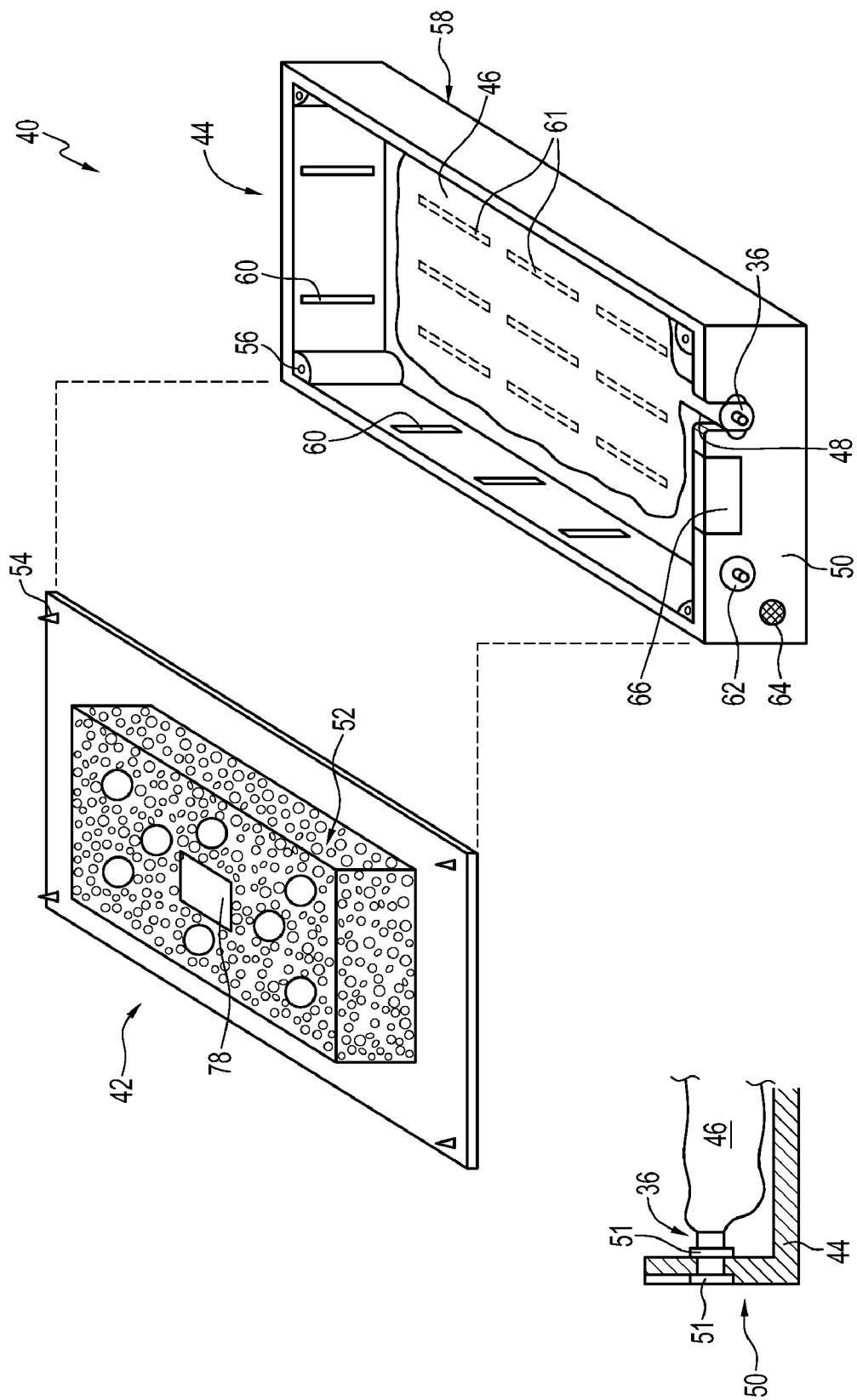

FUEL GAUGE FOR FUEL CARTRIDGES

CROSS-REFERENCE TO RELATED APPLICATIONS

The present application is a division of co-pending, commonly-owned U.S. patent application Ser. No. 10/725,236, which was filed on Dec. 1, 2003.

FIELD OF THE INVENTION

This invention generally relates to a fuel gauge for cartridges supplying fuel to various fuel cells.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely, fuel cells utilizing compressed hydrogen ($H_2$) as fuel; proton exchange membrane (PEM) fuel cells that use methanol ($CH_3OH$), sodium borohydride ($NaBH_4$), hydrocarbons (such as butane) or other fuels reformed into hydrogen fuel; and PEM fuel cells that use methanol ($CH_3OH$) fuel directly ("direct methanol fuel cells" or DMFC). Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode and the oxidant is supplied to the cathode. The chemical-electrical reaction at each electrode and the overall reaction for a direct methanol fuel cell are described as follows:

Half-reaction at the anode:

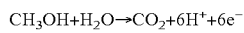

Half-reaction at the cathode:

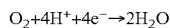

The overall fuel cell reaction:

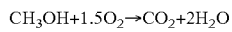

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers, and power tools, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

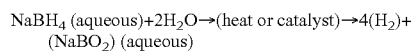

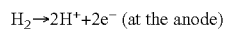

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

Gauging the remaining fuel is an important consideration during the useful life of a fuel cartridge. The known art discloses various sensors for measuring the liquid level in a vertical tank or sensors to measure the concentration of methanol in the fuel-water mixtures. For example, United States published patent application no. 2003/0077491 discloses a liquid level detector that measures the compressive force exerted by the weight of a container. United States published patent application no. 2003/0091883 mentions a general sensor for ascertaining liquid level. U.S. Pat. No. 6,584,825 discloses a fuel gauge for hydrogen gas. U.S. Pat. Nos. 6,254,748 and 6,306,285 and published patent application nos. 2003/00131663 and 2003/013462 disclose various methods and apparatus for measuring the concentration of methanol in the fuel mixture. The prior art, however, does not discloses a fuel gauge that functions at any fuel cartridge orientation.

SUMMARY OF THE INVENTION

Hence, the present invention is directed to a fuel gauge for a fuel supply to a fuel cell.

The present invention is also directed to a fuel gauge for fuel supply that functions in any orientation of the fuel supply.

The present invention is also directed to a fuel gauge for a fuel supply, which is readable by the fuel cell or the electronic equipment that the fuel cell powers.

A preferred embodiment of the present invention is directed to a fuel gauge adapted for use with a fuel supply and an electronic equipment powered by a fuel cell, said fuel gauge comprises a property that is readable by an electrical circuit, wherein said property is related to the amount of fuel remaining in the fuel supply. The fuel gauge is functional at any orientation of the fuel supply.

The readable property can be an electrical capacitance between two nodes and wherein the first node is located at a position that moves as fuel is removed from the fuel supply. The first node can be located on a liner containing the fuel and the liner is positioned within the fuel supply. The second node is located on the fuel cell or on the electronic equipment.

The readable property can be a magnetic force between two poles and wherein the first pole is located at a position that moves as fuel is removed from the fuel supply. The first pole can be located on a liner containing the fuel and the liner is positioned within the fuel supply. The second pole is located on the fuel cell or on the electronic equipment.

The readable property can be the resistance of a semi-conducting resistor. Preferably, the semi-conducting resistor is a thermistor. The thermistor is located adjacent to the fuel, and preferably located adjacent to a liner containing the fuel. Alternatively, the thermistor is located within the fuel. The electrical circuit can send an electrical current either intermittently or continuously to the thermistor to gage the amount of remaining fuel.

The readable property can also be the resistance of a bi-metal resistor. Preferably, the bi-metal resistor is a thermocouple. The thermocouple is located adjacent to the fuel, and preferably located adjacent to a liner containing the fuel. Alternatively, the thermocouple is located within the fuel. The electrical circuit can send an electrical current either intermittently or continuously to the thermocouple to gage the amount of remaining fuel.

The readable property can also be an oscillating magnetic field generated by an inductive sensor. A second sensor interferes with the magnetic field causing eddy currents to form. The inductive sensor is preferably located on the fuel cell or the electronic device and the second sensor is spaced apart from the inductive sensor. The distance between the inductive sensor and the second sensor, which correlates to the remaining fuel, is related to the strength of the oscillating magnetic field.

The electrical circuit is located in the fuel cell or in the electronic device. Preferably, the fuel supply is a fuel cartridge. The fuel supply includes disposable cartridges, refillable cartridges, reusable cartridges, cartridges that reside inside the electronic device, cartridges that are outside of the electronic device, fuel tanks, fuel refilling tanks, and fuel containers.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is an exploded view of a fuel cartridge in accordance with an embodiment of the present invention in an open position showing a portion of the fuel gauge, and FIG. 1A is a cross-sectional view of a valve connectable to a liner in the cartridge;

DETAILED DESCRIPTION OF THE PREFERRED EMBODIMENTS

Figure 2A:
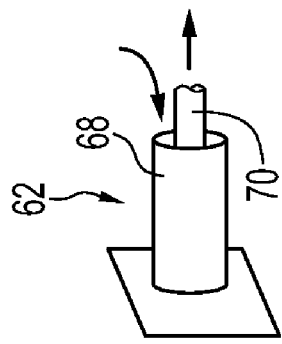
FIGS. 2A and 2B are perspective views of other valves connectable to the liner.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell, reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water, discussed above. Fuels further include hydrocarbon fuels, which include, but are not limited to, butane, kerosene, alcohol, and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids contained in the supply. The term "fuel" as used herein includes all fuels that can be reacted in fuel cells, and includes, but is not limited to, all of the above suitable fuels, electrolytic solutions, oxidant solutions, liquids, and/or chemicals and mixtures thereof.

As used herein, the term "fuel supply" includes, but is not limited to, disposable cartridges, refillable/reusable cartridges, cartridges that reside inside the electronic device, cartridges that are outside of the electronic device, fuel tanks, fuel refilling tanks, and other containers that store fuel. While a cartridge is described below in conjunction with the exemplary fuel gauge embodiments, it is noted that these exemplary embodiments are also suitable for other fuel supplies and the present invention is not limited to any particular type of fuel supplies.

Suitable fuel supplies include those disclosed in co-pending patent application Ser. No. 10/356,793, entitled "Fuel Cartridge for Fuel Cells," filed on Jan. 31, 2003. The disclosure of this application is hereby incorporated in its entirety. An embodiment of a suitable fuel cell cartridge is shown in FIG. 1. Cartridge 40 may contain any type of fuel cell fuels, as discussed above. Cartridge 40 comprises housing top 42 and housing body 44. Body 44 is configured and dimensioned to receive fuel liner 46. Fuel liners are fully disclosed in commonly owned, co-pending patent application Ser. No. 10/629,004, entitled "Fuel Cartridge with Flexible Liner," filed on Jul. 29, 2003. The disclosure of this application is hereby incorporated by reference in its entirety. Liner 46 is connected to shut-off valve 36. Suitable shut-off valves include those disclosed in commonly owned, co-pending patent application Ser. No. 10/629,006, entitled "Fuel Cartridge With Connecting Valve," filed on Jul. 29, 2003. The disclosure of this application is hereby incorporated in its entirety. Valve 36 can be used to fill liner 46 with fuel, and it can also be used to selectively transport fuel from the liner to the fuel cell. In one aspect, valve 36 is mounted on upstanding endwall 50 of body 44. Endwall 50 defines slot 48, which is adapted to receive valve 36. As shown in FIG. 1A, valve 36 comprises two external flanges 51 that straddle endwall 50 to secure valve 36 in place. Preferably, the outer flange is flushed with the outer surface of endwall 50, as shown. After valve 36 is seated, slot 48 can be sealed with a plug or a gasket inserted into slot 48. The plug or gasket can be made from elastomeric or rubber material, filler materials among other suitable sealing materials.

Top 42 has compressible foam 52 affixed to its inside surface. Foam 52 can be single layer or multi-layer foam. Foam 52 is positioned adjacent to liner 46 before liner 46 is filled. Top 42 is placed on top of body 44 by means of guides 54 and corresponding holes 56. Top 42 can be attached to body 44 by any means known in the art, such as adhesive bonding, ultrasonic bonding, radio frequency, welding, heat sealing, or the like. Endwall 50 and the other sidewalls are similarly attached to each other and to bottom 58. Alternatively, the sidewalls are integrally formed to bottom 58, e.g., by injection molding, compression molding or thermal forming. Endwall 50 and the other sidewalls preferably have a plurality of guides 60 to guide the compression and expansion of foam 52 and liner 46.

Endwall 50 may also have venting valve 62 or gas permeable, liquid impermeable membrane 64 to allow air to vent when cartridge 40 is filled, or gas byproduct produced by the fuel cell reaction to vent during use. Membrane 64 can be a gas permeable, liquid impermeable membrane to allow air to enter as fuel is consumed to minimize a vacuum from forming inside the cartridge. Such membranes can be made from polytetrafluoroethylene (PTFE), nylon, polyamides, polyvinylidene, polypropylene, polyethylene or other polymeric membrane. Commercially available hydrophobic PTFE microporous membrane can be obtained from W.L Gore Associates, Inc, Milspore, Inc. and Filtrona, Inc., among others. Goretex® is a suitable membrane. Goretex® is a microporous membrane containing pores that are too small for liquid to pass through, but are large enough to let gas through.

Figure 2B:
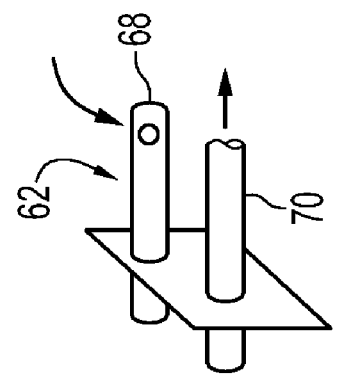
Figure 2:
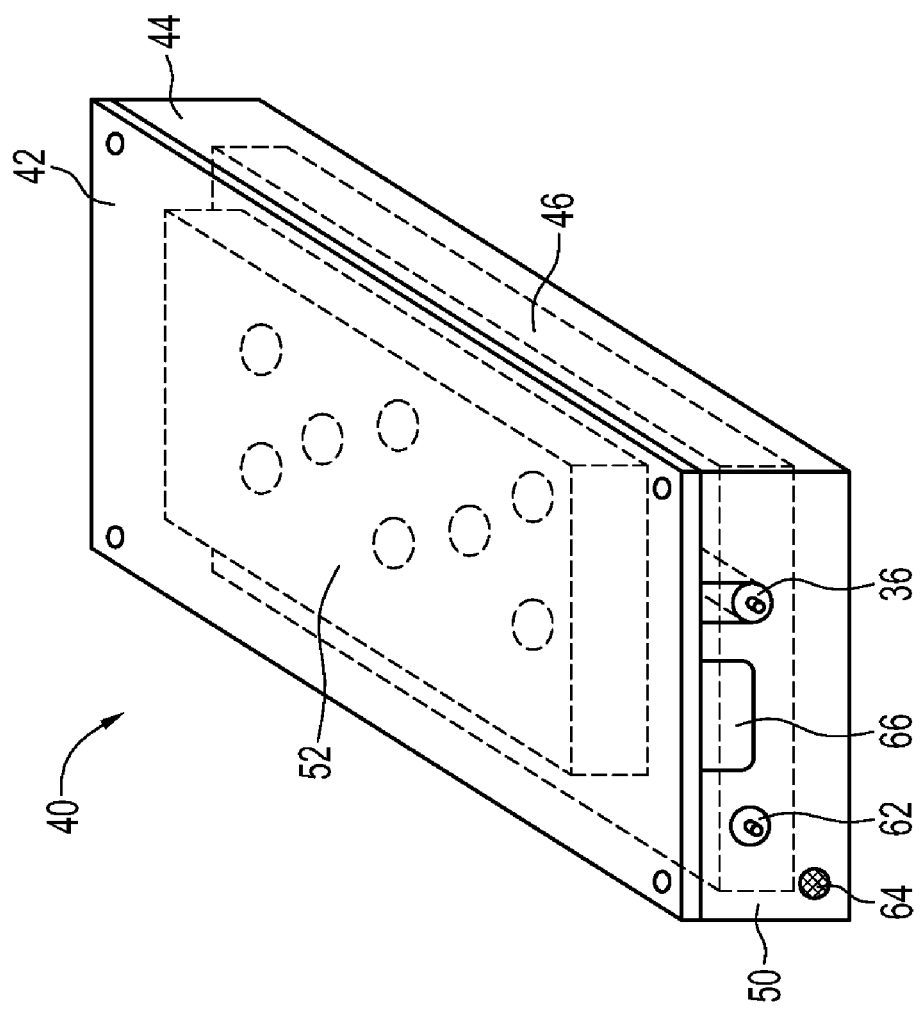
FIG. 2 is a perspective view of the cartridge of FIG. 1 in a closed position.

As illustrated in FIG. 2, after top 42 is assembled on body 44, foam 52 should be flushed with bottom 58 and empty liner 46. As fuel is pumped into the cartridge through shut-off valve 36, liner 46 expands and compresses foam 52. As foam 52 is compressed, it stores potential spring energy to pressurize liner 46 and assists in the transport of fuel to the fuel cell during use. Also, as fuel is pumped into the cartridge, air trapped in the cartridge is vented through membrane 64. Alternatively, air may be vented through vent valve 62. In one embodiment, valve 62 comprises channels 68 and 70. Channel 68 allows air and other gases to vent, while channel 70 allows liquid and gas byproducts produced by the fuel cell to be transported to the cartridge, if needed. As shown in FIGS. 2A and 2B, channels 68 and 70 are co-axial to each other, i.e., they can be positioned side-by-side to each other or, one can be positioned inside the other. Alternatively, liner 46 can be pre-filled with fuel and is then inserted into body 44 before top 42 is attached to body 44. Top 42 compresses foam 52 while being attached to body 44.

Figure 4:
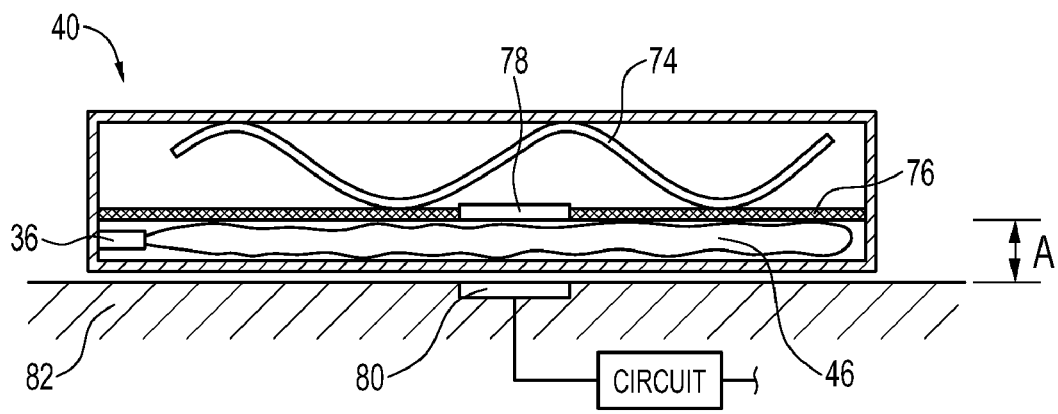
FIG. 4 is another embodiment of FIG. 3.

Foam 52 may have varying porosity throughout its thickness, and may have a single layer or a plurality of layers. As illustrated in FIG. 4, foam 52 can be replaced by wave or leaf spring 74 and biased plate 76.

Figure 3:
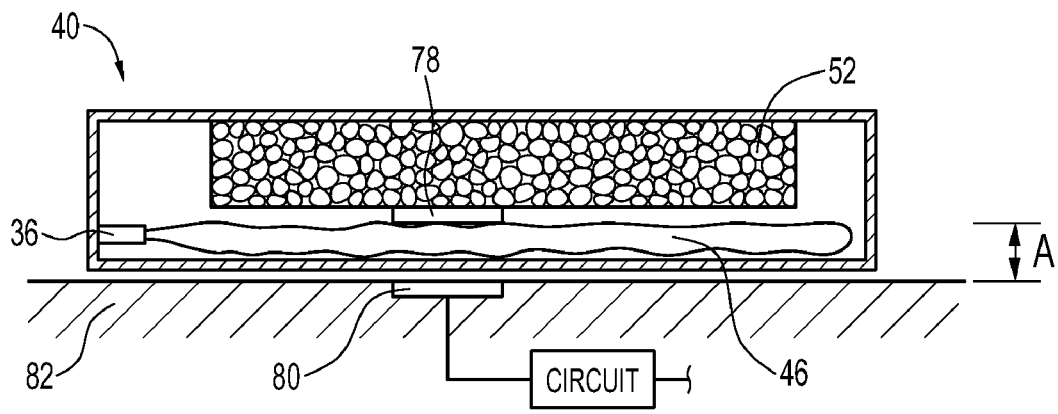
FIG. 3 is a cross-sectional view showing the fuel cartridge of FIGS. 1 and 2 with a fuel gauge.

A fuel gauge mechanism in accordance with one aspect of the present invention is shown in FIGS. 1, 3 and 4. In this embodiment, the fuel gauge comprises two sensors, and first sensor 78 is placed within cartridge 40. First sensor 78 should be placed on a location that moves as the fuel is removed to reflect the level of fuel remaining in the cartridge. For example, first sensor 78 can be placed directly on liner 46, or on foam 52 or biased plate 76. As shown, first sensor 78 is placed on foam 52 where it contacts liner 46 or on biased plate 76 where it contacts liner 46. Second sensor 80 is positioned outside of cartridge 40, e.g., on fuel cell or electronic device 82. Second sensor 80 is electrically connected to either the fuel cell or to the electronic device that the fuel cell powers. The electrical circuit (schematically shown) connected to second sensor 80 can measure electrical or magnetic properties between these sensors, which correlate or are related to the fuel level. The electrical circuit can also be connected to first sensor 78 via an electrical wire extending through the wall of the cartridge.

As used herein, "relate," "related," "correlate" or "correlated" when used to describe the relationship between a property measured by the sensors and the remaining fuel level include direct relationship, i.e., the measured property decreases as the remaining fuel level decreases, or indirect relationship, i.e., the measure property increases as the remaining fuel level decreases and vice versa. Also, direct and indirect relationships include both linear and nonlinear changes between the measured property and the remaining fuel level.

In one example, first and second sensors are made from magnetic or magnetized material. The sensors may have magnetic attraction toward each other or magnetic repulsion for each other, as a function of the distance "A" between the sensors. When liner 46 is emptied, the two sensors are in close proximity or touching each other (A is smallest) and the magnetic force between them is strongest. When liner 46 is full, the two sensors are the farthest away from each other (A is largest), and the magnetic force between them is weakest. By calibrating between these two measured points, the fuel level remaining in liner 46 as a function of distance "A" can be estimated.

In another example, first and second sensors are made from electrically conductive material and form a capacitor between them. Second sensor 80 is connected to an electrical circuit (not shown) that can measure the capacitance between the two sensors. The capacitance between these sensors is a function of distance "A," and of the dielectric constants of the materials between the sensors. In this example, the dielectric constants of the outer shell of cartridge 40, the material of liner 46 and the fuel are relevant to the measurement of capacitance. The electrical circuit would charge second sensor 80 to a voltage relatively higher than first sensor 78, and a capacitance between the sensors can be measured. When liner 46 is emptied, then the two sensors are in close proximity or touching each other (A is smallest) and the capacitance between them is smallest. When liner 46 is full, the two sensors are the farthest away from each other (A is largest), and the capacitance between them is largest. By calibrating between these two measured points, the fuel level remaining in liner 46 as a function of distance "A" can be estimated.

The magnetic field can be measured with a Hall sensor placed on sensor 80 and connected to the electrical circuit. The Hall sensor generates a voltage that is related to the strength of the magnetic field generated between sensor 78 and sensor 80, when a current flows through the Hall sensor. The electrical circuit supplies the current and measures the generated voltage. Hall sensors are commercially available from Micronas Semiconductor Holding AG in Zurich, Switzerland. Other sensors can be used to measure the magnetic field, such as strain gages that measure the strain on sensor 80 caused by the magnetic forces. In this instance, sensor 80 should be mounted in a cantilever manner to maximize the measurable strain.

An advantage of using first and second sensors 78 and 80 is that the electrical circuit(s) for measuring fuel level resides in the fuel cell or electronic equipment and is reusable. Second sensor 80 is also reusable. Only first sensor 78 is replaced if cartridge 40 is disposable, or when reusable cartridge 40 is replaced at the end of its useful life. This reduces the costs and complexity of making fuel cartridges. Another advantage is that these sensors measure the remaining fuel without any physical contact with the fuel.

Other methods of estimating the remaining fuel level using first and second sensors 78 and 80 can be devised pursuant to this disclosure, and the present invention is not so limited to any particular method described herein.

In accordance with another aspect of the present invention, a thermistor (or thermister) can be used to measure the remaining fuel in fuel cartridge 40. A thermistor is a semi-conducting resistor that is sensitive to temperature changes. In other words, the resistance of the thermistor changes as the temperature changes. Generally, there are two types of thermistors: negative temperature coefficient (NTC) thermistors and positive temperature coefficient (PTC) thermistors. NTC thermistors display a decrease in its resistance when exposed to increasing temperature, and PTC thermistors display an increase in its resistance when exposed to decreasing temperature. Thermistors have been traditionally used to measure the temperature of a system or a fluid.

An important aspect of the thermistor's resistance depends on the thermistor's body temperature as a function of the heat transfer inside the fuel cartridge and the heat transfer within the electronic device that the fuel cell powers. Heat transfer occurs mainly by conduction and radiation in this environment or from heating caused by power dissipation within the device. In traditional temperature measuring function, self heating must be compensated so that the accurate temperature can be obtained. In accordance with the present invention, self heating is not compensated so that the capacity to dissipate heat of the remaining fuel inside fuel cartridge can be gauged. The heat capacity is related to the amount of fuel remaining in the cartridge. Both NTC and PTC thermistors are usable with the present invention.

Generally, heat capacitance or heat conductivity is described as the ability of a fluid, i.e., liquid or gas, to conduct or dissipate heat. Liquid, such as water or methanol, has a much higher capacity to dissipate heat than gas, such as air or carbon dioxide. The capacity of a fluid to dissipate heat is equal to its heat capacitance, which is a constant for a particular fluid, multiply by the fluid volume. Hence, this aspect of the present invention measures the volume of the remaining fuel by measuring the electrical resistance of the thermistor positioned within the fuel or on liner 46 containing the fuel. The electrical resistance is then converted to the capacity of the remaining fuel to dissipate heat, and this capacity is converted to the volume of remaining fuel by dividing out the heat capacitance constant. In other words, higher heat capacity corresponds to higher the remaining fuel volume.

The thermistor-fuel gauge should be calibrated prior to use. The operating temperatures of the fuel cell and of the electronic device are known. An electrical signal from a full liner is recorded and then an electrical signal from an empty liner is recorded. One or more signals from known partial volumes can also be recorded. A calibration curve can be drawn from these calibration points between these operating temperatures. A real-time signal is compared to this calibration curve to determine the remaining fuel. Other methods of calibrations can be performed without deviating from the present invention.

Additionally, since the thermistor is a resistor, electrical current that flows through the thermistor generates heat. Therefore, electrical current can flow through the thermistor to generate heat that can be dissipated by the remaining fuel, and accurate readings can be obtained. In one embodiment, the fuel cell sends the current as a query to the thermistor to gauge the amount of heat dissipation whenever a remaining fuel reading is desired. The electrical current can be sent intermittently or continuously.

Figure 5:
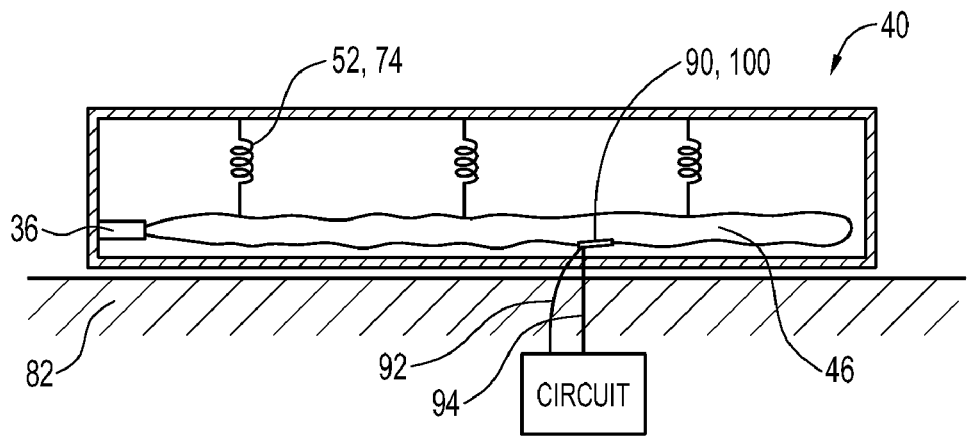
FIG. 5 illustrates other embodiments of the present invention.

As illustrated in FIG. 5, cartridge 40 has liner 46 containing fuel. Liner 46 is pressurized by spring 52, 74 or any other suitable device that can store potential energy. The spring is represented generically in FIG. 5. Fuel gauge 90 is a thermistor in this embodiment and is connected to the circuit through wires 92 and 94. Fuel gauge 90 is preferably positioned on the surface of the liner and isolated from the fuel. This circuit measures the heat capacity of the fuel and thereby the volume of remaining fuel. The circuit can also apply a voltage across gauge 90 to send a current through gauge 90 to measure the heat dissipation by the remaining fuel, as described above. Alternatively, gauge 90 can be positioned inside liner 46 and in direct contact with the fuel.

In accordance with another aspect of the present invention, a thermocouple can be used as a fuel gauge. A thermocouple is also typically used to measure temperature and comprises two wires made from different metals, and is also known as a bi-metal sensor. The wires are joined at two junctions. A potential difference is established when a measuring junction is at a temperature that is different than a temperature at a reference junction. The reference junction is typically kept a known temperature, such as the freezing point of water. This potential difference is a DC voltage which is related to the temperature at the measuring junction. Using a thermocouple to measure temperature is well known in the art.

Similar to the thermistor, a thermocouple acts like a resistor that is sensitive to temperature. The thermocouple is capable of measuring the heat capacity of the remaining fuel by measuring the potential difference. Hence, the thermocouple can also measure the remaining fuel. Alternatively, electrical current can be sent through the measuring junction of the thermocouple. The current heats up the measuring junction and the fuel dissipates the heat. The amount of heat dissipated, therefore, relates to the remaining fuel. The current can be sent intermittently or continuously. The thermocouple fuel gauge should be calibrated similar to the calibration of the thermistor, discussed below.

As shown in FIG. 5, measuring junction 100 of the thermocouple can be positioned on liner 46 or inside the liner and in contact with the fuel. Since the thermocouple is not used to measure temperature, a reference junction is optional.

In accordance with another aspect of the present invention, an inductive sensor can be used to measure the remaining fuel. Inductive sensors are typically used as on/off proximity switches. An inductive sensor contains a wire coil and a ferrite core, which form the inductive portion of an inductive/capacitance (LC) tuned circuit. This circuit drives an oscillator, which in turn generates a symmetrical, oscillating magnetic field. When an electrical conductor, such as a metal plate, enters this oscillating field, eddy currents are formed in the conductor. These eddy currents draw energy from the magnetic field. The changes in the energy correlate to the distance between the inductive sensor and the electrical conductor.

Referring to FIGS. 3 and 4, sensor 80 can be the inductive sensor and sensor 78 can be the electrical conductor. The distance between sensor 80 and sensor 78 in this embodiment correlates to the volume of remaining fuel. The electrical circuit illustrated in FIGS. 3 and 4 can measure the changes in the magnetic field directly or with Hall sensors, discussed above. Inductive sensors are commercially available from IFM Efector, Inc., in Exton, Pa. and from Sensource in Youngstown, Ohio, among others.

The fuel gauges described herein do not depend on any orientation of the fuel cartridge; they can function in any orientation. These gauges are usable with pressurized and non-pressurized fuel supplies containing any type of fuel for use in any fuel cell. Also, these fuel gauges can be read by controller(s) such as those disclosed in co-pending application entitled "Fuel Cell System Including Information Storage Device and Control System," filed on even date herewith and published as U.S. Patent Application Publication No. US 2005/0118468 on Jun. 2, 2005. This co-pending patent application is incorporated herein by reference in its entirety.

Figure 6:
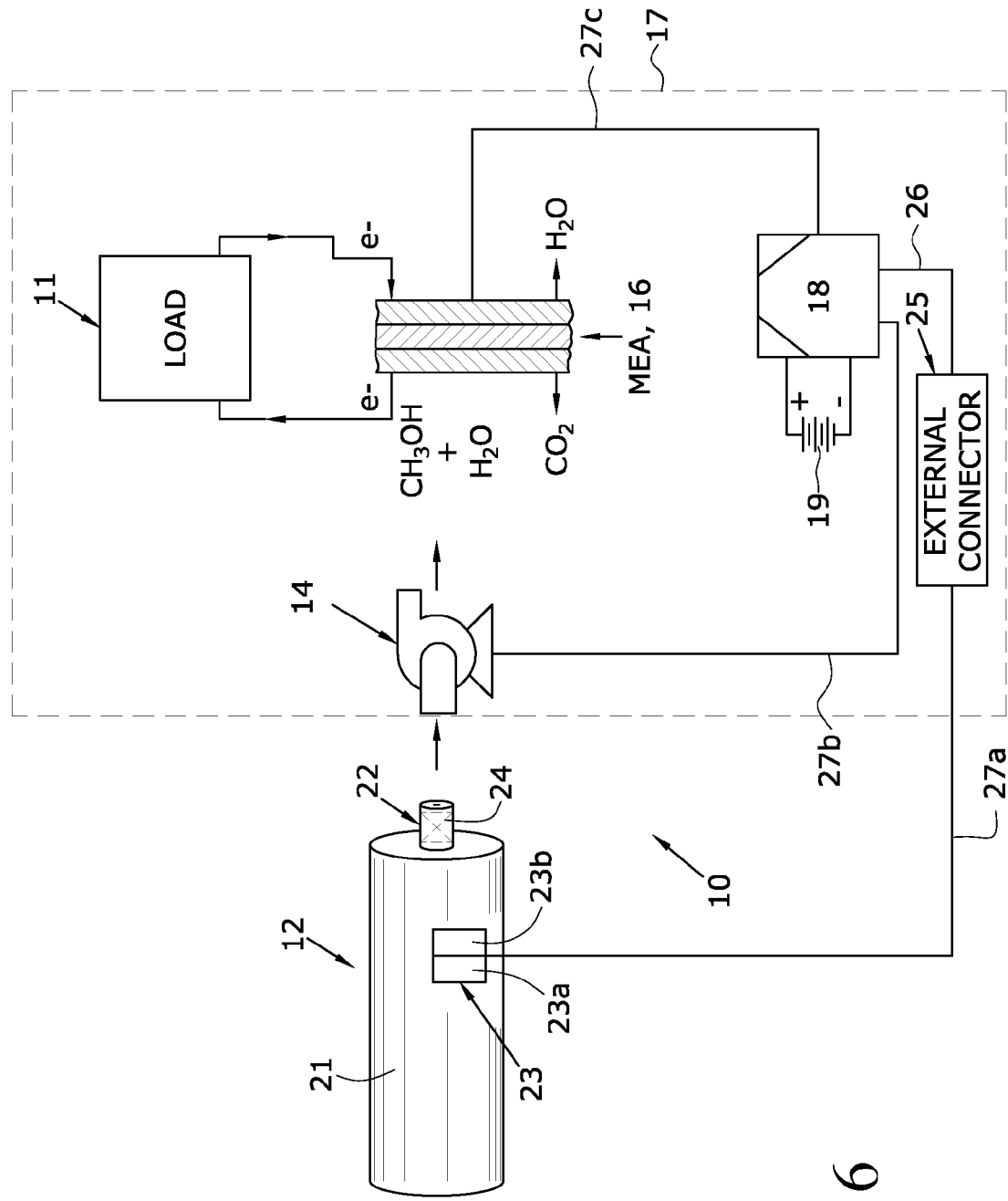
FIG. 6 is a schematic view of a fuel cell system including a fuel cartridge with an information storage device, a pump, and an MEA for powering an electronic device.

As described in the '468 publication, referring to FIG. 6 which corresponds to FIG. 1 of the '468 publication, an embodiment of a fuel cell 10 according to the present invention showing an information storage device 23 capable of controlling the sensors of the embodiments as described above. In the present embodiment, a housing 17 supports, encloses and protects an electronic device 11 and its electronic circuitry, a pump 14, and a membrane electron assembly (MEA) 16. Housing 17 is preferably configured such that fuel cartridge 12 is easily removable from a chamber in housing 17 by the consumer/end user. Fuel cartridge 12 possesses an ability to store information such as fuel content including fuel content during usage, fuel quantity, fuel type, anti-counterfeit information, expiration dates based on age, manufacturing information and to receive information such as length of service, number of refuels, and expiration dates based on usage. A more complete list of relevant information is listed below.

A controller 18 is preferably provided within housing 17 to control the functions of electronic device 11, cartridge 12, pump 14 and MEA 16, among other components. Preferably, the housing also supports at least one optional battery 19 for powering various components of fuel cell 10 and electronic device 11 when MEA 16 is not operating or during system start-up. Alternatively, optional battery 19 powers controller 18 when cartridge 12 is empty or when fuel cell 10 or MEA 16 is off. Optional battery 19 can be replaced by or used in conjunction with solar panels.

With further reference to FIG. 6, fuel cartridge 12 comprises an outer shell or outer casing 21 and a nozzle 22. Outer casing 21 supports information storage device 23. Controller 18 can also read operating information, such as temperature and pressure of the electronic device or the fuel cell and the electricity produced by the fuel cell, and write or record this information on information storage device 23. Due to information storage device 23, fuel supply 10 possesses an ability to store information such as fuel content including fuel content during usage, fuel quantity, fuel type, anti-counterfeit information, expiration dates based on age, manufacturing information and to receive information such as length of service, number of refuels, and expiration dates based on usage. A more complete list of relevant information is listed below.

Suitable information storage devices 23 include, but are not limited to, random access memory (RAM), read-only memory (ROM), programmable read-only memory (PROM), erasable programmable read-only memory (EPROM), electrically erasable programmable read-only memory (EEPROM), flash memory, electronically readable elements (such as resistors, capacitance, inductors, diodes and transistors), optically readable elements (such as bar codes), magnetically readable elements (such as magnetic strips), integrated circuits (IC chips) and programmable logic arrays (PLA), among others. The preferred information storage device 23 includes PLA and EEPROM, and the present invention is described herein with the EEPROM. However, it is understood that the present invention is not limited to any particular type of information storage device 23.

Typically, information is stored as zeros (0) and ones (1) in the binary system. Groups of these binary digits form octal digits (groups of 3 binary digits) or hexadecimal digits (groups of 4 binary digits). Hexadecimal digits are commonly used for ease of reading information storage device 23.

EEPROM is a user-modifiable read-only memory that can be erased and rewritten or reprogrammed repeatedly throughout its useful life through the application of higher than normal electrical writing voltage on the same pin among other programming MEAns. EEPROM does not need to be removed from the fuel supply to be modified. Advantageously, portions of an EEPROM can be write-protected, i.e., information originally written is saved and protected from the writing voltage, while other portions of the EEPROM can be repeatedly rewritten. Additionally, an EEPROM, similar to other ROMs, does not need electrical power to maintain the memory or data stored thereon. Hence, when an electrical device powers up, it relies on the information stored on an EEPROM to start-up and runs its programming. To erase and rewrite an EEPROM, a controller directs a predetermined voltage at a particular location of the EEPROM to store new information thereon.

EEPROM, as well as the other ROMs, are widely available commercially. Suitable EEPROMs are available from Cypress Semiconductor Corp. of San Jose, Calif., and Altera Corp. of San Jose, Calif., ATMEL Corporation of Hayward, Calif. and Microchip Technology Inc. of Chandler, Ariz., among others.

Relevant information to be stored on information storage device 23 includes protectable information and rewritable information. Protectable information, which cannot be erased, includes, but is not limited to:

(1) type of cartridge 12,
(2) date cartridge 12 was manufactured,
(3) lot number for cartridge 12,
(4) sequential identification number assigned to cartridge 12 during manufacturer,
(5) date information storage device 23 was manufactured,
(6) lot number for information storage device 23,
(7) sequential identification number assigned to information storage device 23,
(8) machine identification number for cartridge 12 and/or storage device 23,
(9) shift (i.e., time of day) during which cartridge 12 and/or storage device 23 were produced,
(10) country where cartridge 12 and/or storage device 23 were produced,
(11) facility code identifying the factory where cartridge 12 and/or storage device 23 were produced,
(12) operating limits, including but not limited to temperature, pressure, vibration tolerance, etc.

(13) materials used in manufacturing,
(14) anti-counterfeit information,
(15) fuel information, such as chemical formulation, concentration, volume, etc.,
(16) intellectual property information, including patent numbers and registered trademarks,
(17) safety information,
(18) security password or identification,
(19) expiration date based on date of manufacturing,
(20) shut-down sequence,
(21) hot swap procedure,
(22) recycling information,
(23) reactant information,
(24) fuel gauge type, and
(25) fluid sensor information.

Rewritable information includes, but is not limited to:
(1) current fuel level and/or current ion level in the fuel,
(2) number of ejections/separations of cartridge 12 from electrical device 11 and/or MEA 16 or number of times that cartridge 12 was refilled,
(3) fuel level on ejection/separation of cartridge 12 from electrical device 11 and/or MEA 16,
(4) number of insertions/connections of cartridge 12 to electrical device 11 and/or MEA 16,
(5) fluid level on insertion/connection of cartridge 12 to electrical device 11 and/or MEA 16,
(6) current operation status including rate of power consumption, acceptance/rejection of a particular electronic device 11,
(7) maintenance status and marketing information for future cartridge 12 designs,
(8) triggering events,
(9) expiration date based on actual usage,
(10) efficiency of the system,
(11) operational history of the fuel cell system, such as temperatures and pressures during selected time periods (e.g., at start-ups and shut-downs or periodically), and
(12) operational history of the electronic devices 11, such as number of digital pictures per cartridge, maximum torque for power tools, talking minutes and standby minutes for cell phones, number of address look-ups per cartridge for PDAs, etc.

Manufacturing information stored on information storage device 23 can help controller 18 to analyze the performance of fuel cartridge 12, to identify recalled or expired cartridges 12 and to ensure that the proper fuel cartridge 12 is connected to electronic device 11. The cartridge's volume can also be stored and accessed. As discussed above, calibration tables or curves for the sensors for the fuel gauge may also be provided.

While it is apparent that the illustrative embodiments of the invention disclosed herein fulfill the objectives stated above, it is appreciated that numerous modifications and other embodiments may be devised by those skilled in the art. For example, the fuel supplies disclosed herein can be used without liners, such as liner 46. As most clearly illustrated in FIG. 4, plate 76 can form a seal with the side walls of cartridge 40 and fuel is stored below plate 76. Sensors 78 and 80 are located at the same positions as shown. Therefore, it will be understood that the appended claims are intended to cover all such modifications and embodiments, which would come within the spirit and scope of the present invention.

We claim:

1. A fuel gauge adapted for use with a fuel supply and an electronic equipment powered by a fuel cell, said fuel gauge comprising a moveable single node having a property that is readable by an electrical circuit, and wherein said property is related to the amount of fuel remaining in the fuel supply wherein said property is the resistance of a semi-conducting resistor.

2. The fuel gauge of claim 1, wherein the semi-conducting resistor comprises a thermistor.

3. The fuel gauge of claim 2, wherein the thermistor is located within the fuel.

4. The fuel gauge of claim 2, wherein the thermistor is located adjacent to the fuel.

5. The fuel gauge of claim 4, wherein the thermistor is located adjacent to a liner containing the fuel, and the liner is positioned within the fuel supply.

6. The fuel gauge of claim 2, wherein the electrical circuit sands an electrical current to the thermistor to gage the amount of remaining fuel.

7. The fuel gauge of claim 6, wherein the electrical current is sent intermittently.

8. The fuel gauge of claim 6, wherein the electrical current is sent continuously.

9. A fuel gauge adapted for use with a fuel supply and an electronic equipment powered by a fuel cell, said fuel gauge comprising a moveable single node having a property that is readable by an electrical circuit, and wherein said property is related to the amount of fuel remaining in the fuel supply wherein said property is the resistance of a bi-metal resistor.

10. The fuel gauge of claim 9, wherein the bi-metal resistor is a thermocouple.

11. The fuel gauge of claim 10, wherein the thermocouple is located within the fuel.

12. The fuel gauge of claim 10, wherein the thermocouple is located adjacent to the fuel.

13. The fuel gauge of claim 12, wherein the thermocouple is located adjacent to a liner containing the fuel, and the liner is positioned within the fuel supply.

14. The fuel gauge of claim 10, wherein the electrical circuit sends an electrical current to the thermocouple to gage the amount of remaining fuel.

15. The fuel gauge of claim 14, wherein the electrical current is sent intermittently.

16. The fuel gauge of claim 15, wherein the electrical current is sent continuously.

17. A single node fuel gauge adapted for use with a fuel supply and an electronic equipment powered by a fuel cell, said fuel gauge is movable and comprises an electrical resistance that is readable by an electrical circuit, wherein said the electrical resistance is related to the amount of fuel remaining in the fuel supply.

18. The fuel gauge of claim 17, wherein the electrical resistance is the resistance from a semi-conducting resistor.

19. The fuel gauge of claim 18, wherein the semi-conducting resistor is a thermistor.

20. The fuel gauge of claim 17, wherein the electrical resistance is the resistance from a bi-metal resistor.

21. The fuel gauge of claim 20, wherein the bi-metal resistor is a thermocouple.

* * * * *